US010617126B2

(12) United States Patent
Gasbarro (10) Patent No.: US 10,617,126 B2
(45) Date of Patent: Apr. 14, 2020

(54) POULTRY SKINNER WITH BELT (71) Applicant: Prime Equipment Group, LLC, Columbus, OH (US)

(72) Inventor: Geno N. Gasbarro, Columbus, OH (US)

(73) Assignee: PRIME EQUIPMENT GROUP, LLC, Columbus, OH (US)

(*) Notice: Subject to any disclaimer, the term of this patent is extended or adjusted under 35 U.S.C. 154(b) by 0 days.

(21) Appl. No.: 16/399,062

(22) Filed: Apr. 30, 2019

(65) Prior Publication Data
US 2019/0327984 A1 Oct. 31, 2019

Related U.S. Application Data (60) Provisional application No. 62/664,513, filed on Apr. 30, 2018.

(51) Int. Cl.
A22C 21/00 (2006.01)
(52) U.S. Cl.
CPC ...... A22C 21/0092 (2013.01); A22C 21/0053 (2013.01)
(58) Field of Classification Search
CPC ............................ A22C 21/00; A22C 21/0092
USPC ............................................. 452/125, 127–130
See application file for complete search history.

(56) References Cited

U.S. PATENT DOCUMENTS

| 5,738,577 | A | * | 4/1998 | Long | A22C 17/12 452/127 |
|---|---|---|---|---|---|
| 6,264,542 | B1 | * | 7/2001 | Gasbarro | A22C 21/0092 452/125 |
| 6,659,856 | B2 | * | 12/2003 | Long | A22C 17/12 452/127 |
| 6,699,116 | B1 | * | 3/2004 | Gasbarro | A22C 17/04 452/125 |
| 7,244,174 | B2 | * | 7/2007 | Schill | A22B 5/166 452/130 |
| 2009/0170417 | A1 | | 7/2009 | Janssen et al. | |
| 2010/0048114 | A1 | | 2/2010 | Van Den Nieuwelaar et al. | |
| 2012/0231716 | A1 | | 9/2012 | Janssen et al. | |

* cited by examiner

Primary Examiner — Richard T Price, Jr.
(74) Attorney, Agent, or Firm — Christensen O'Connor Johnson Kindness PLLC (57) ABSTRACT An automated poultry skinning apparatus which includes a support frame having a product feed inlet and discharge outlet. The apparatus may house an upper conveyor aligned to engage the upper surface of a piece of poultry product entering the feed outlet. The apparatus is provided with a lower conveyor with a plurality of radially extending protrusions adapted to engage the lower surface of the piece of poultry passing between the lower conveyor and the optional upper conveyor. An arcuate pinch surface is provided which is mounted in closely spaced relationship to the arcuate path traveled by the protrusions of the translated belt and define therewith an opening for trapping the outer skin attached to the poultry product between the arcuate surface and the distal tips of the protrusions to entrap a portion of the skin and pull the skin from the poultry product piece.

20 Claims, 6 Drawing Sheets

POULTRY SKINNER WITH BELT

CROSS-REFERENCES TO RELATED APPLICATIONS

This application claims the benefit of U.S. Provisional Application No. 62/664,513 filed Apr. 30, 2018. This application is hereby incorporated by reference.

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

Existing technology for removing the skin of poultry includes the machine disclosed in U.S. Pat. No. 5,236,323 to Long in which a blade is used to remove skin, and possibly muscle, from a poultry product, which could include a thigh or breast. Technology disclosed in U.S. Pat. No. 6,264,542 to Gasbarro revolutionized the removal of skin from poultry by using a pinch surface and a gripper wheel combination.

Figure 1:
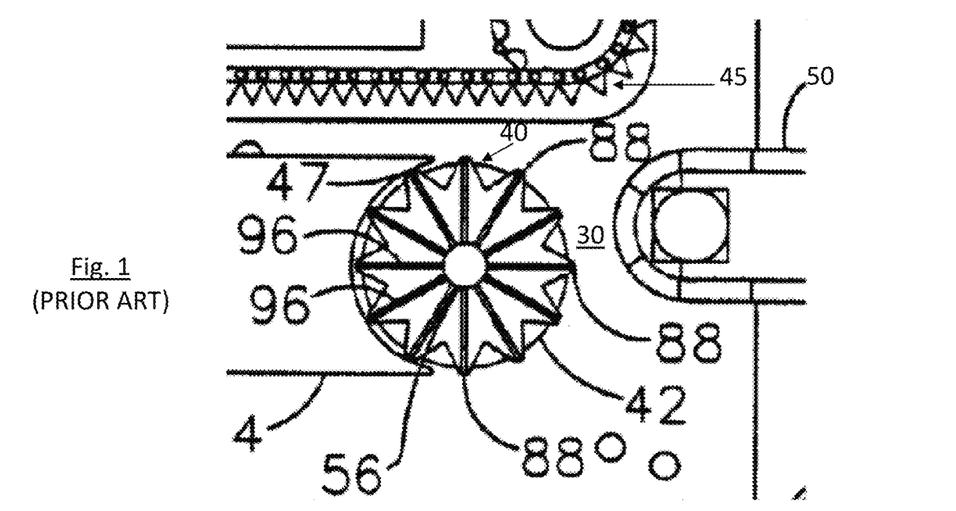
FIG. 1 is a side view illustrating a prior art mechanism.

The pinch surface and gripper wheel combination of U.S. Pat. No. 6,264,542 to Gasbarro is shown in FIG. 1. A rotatably mounted gripper wheel 40 has a plurality of radially extending fins 88 adapted to engage the lower surface of a piece of poultry passing over the gripper wheel 40. In the orientation of FIG. 1, the gripper wheel rotates counter-clockwise. The arcuate pinch surface 47 is mounted in a closely spaced relationship to the arcuate path traveled by the tips of rotating fins 88 on the gripper wheel 40 and defines therein an opening for trapping the outer skin. The skin attached to the poultry is trapped between the arcuate pinch surface 47 and the outer end of the rotating gripper wheel 40 to entrap a portion of the skin and pull the skin from the poultry product.

A top span of the conveyor 50 conveys poultry pieces from the right to the left in the configuration of FIG. 1. The poultry pieces are transported over a gap 30 between the conveyor and the gripper wheel 40 by an upper conveyor 45, which may use "sticker chain" to grip the poultry piece. The poultry piece is then supported by the gripper wheel's fins 88, wherein the skin sags into the gaps between the fins 88. When the poultry piece reaches the pinch surface 47, the skin is pinched between the fins 88 and the pinch surface 47. And as the gripper wheel 40 continues rotating, the skin is gripped and pulled away from the poultry piece as the poultry piece is transported past the gripper wheel 40.

Further refinements of the U.S. Pat. No. 6,264,542 technology are found in U.S. Pat. Nos. 8,187,060 and 9,730,461, both to Gasbarro and U.S. Pat. No. 9,999,234 to Diab. All of the foregoing patents are incorporated herein by reference.

The prior art is a complex assortment of components that can be difficult to clean, modify, repair and maintain. Therefore, the need exists for improvements.

BRIEF SUMMARY OF THE INVENTION

Disclosed herein is an automated poultry product skinning apparatus. The apparatus comprises, in combination, a support frame provided with a product feed inlet and a product discharge outlet. An upper conveyor is mounted to the support frame and aligned to engage an upwardly-facing surface of a piece of poultry product delivered to the feed inlet and direct the piece of poultry product in a path toward the discharge outlet. The upper conveyor is mounted to the frame for selected vertical movement of at least an upstream end of the upper conveyor in response to the size of the piece of poultry product delivered to the feed inlet. A lower conveyor is mounted to the frame and has a plurality of radially extending protrusions having distal tips and disposed in vertically spaced relationship below the upper conveyor for engaging a lower side of the piece of poultry product passing between the lower conveyor and the upper conveyor. A pinch block is mounted on the frame and includes an arcuate surface fixedly positioned in close clearance relationship to the arcuate path of the distal tips of the protrusions during a portion of their translation. This defines an opening configured to engage an outer skin attached to the piece of poultry product between the distal tips of the protrusions and the arcuate surface of the pinch block. The close clearance relationship and the opening are configured to firmly entrap the attached outer skin between the distal tips of each of the protrusions and the arcuate surface of the pinch block to pull the outer skin from its attachment to the underlying muscle portions of the piece of poultry product without piercing or cutting of the outer skin upon continued translation of the protrusions and engagement of the piece of poultry product with the upper conveyor.

Also disclosed is an automated poultry product skinning apparatus comprising, in combination, a support frame provided with a product feed inlet and a product discharge outlet. An upper conveyor is mounted to the support frame and aligned to engage an upper surface of a piece of poultry product delivered to the feed inlet and direct the piece of poultry product in a path toward the discharge outlet. A lower conveyor may be movably mounted to the frame and has a plurality of protrusions having distal tips disposed in vertically spaced relationship below the upper conveyor for engaging a lower surface of the piece of poultry product passing between the lower conveyor and the upper conveyor. A pinch block may be mounted on the frame and includes an arcuate surface fixedly positioned in close clearance relationship to the arcuate path of the distal tips during a portion of their translation. This defines an opening between the outer end of the distal tips and the arcuate surface of the pinch block, wherein the close clearance relationship and the opening are configured to firmly entrap the attached outer skin between the outer ends of the distal tips and the arcuate surface of the pinch block to pull the outer skin from its attachment to underlying muscle portions of the piece of poultry product without piercing or cutting the outer skin upon continued translation of the distal tips and engagement of the piece of poultry product with the conveyor.

Also disclosed is an automated poultry product skinning apparatus comprising, in combination, a support frame provided with a product feed inlet and a product discharge outlet. A conveyor is movably mounted to the frame and has a plurality of protrusions with distal tips disposed for engaging a lower surface of a piece of poultry product delivered to the feed inlet and direct the piece of poultry product in a path toward the discharge outlet. A pinch block is mounted on the frame and includes an arcuate surface fixedly positioned in close clearance relationship to the arcuate path of the distal tips during a portion of their translation to define an opening between the outer end of the distal tips and the arcuate surface of the pinch block. The close clearance relationship and the opening are configured to firmly entrap the attached outer skin between the outer ends of the distal tips and the arcuate surface of the pinch block to pull the outer skin from its attachment to underlying muscle portions of the piece of poultry product without piercing or cutting the outer skin upon continued translation of the distal tips and engagement of the piece of poultry product with the conveyor.

A method of removing the outer skin from a piece of poultry product is disclosed, comprising in combination, the step of introducing a piece of poultry product to a feed inlet defined between a moving conveyor spaced above a lower conveyor provided with a plurality of protrusions having distal tips. An upper surface engages of the poultry product engages with the upper conveyor and a lower surface of the poultry product engages with the distal tips to propel the poultry product along a selected path of travel from the feed inlet toward a discharge outlet. At least a portion of the outer skin attached to the poultry product is gripped between a fixed arcuate surface positioned in closely spaced mating relationship with a portion of the arcuate path of travel of the distal tips of the protrusions to firmly entrap and pull the attached outer skin of the piece poultry product away from its attachment to the underling meat portions without piercing or cutting the outer skin as the piece of poultry product moves along the selected path past the protrusions and toward the discharge outlet.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Pat. Nos. 6,264,542; 6,699,116; 8,187,060; and 9,730,461, all to Gasbarro, are incorporated herein by reference. U.S. Provisional Application No. 62/664,513 filed Apr. 30, 2018, which is the above claimed priority application, is incorporated in this application by reference. U.S. Pat. No. 9,999,234 to Diab is incorporated herein by reference.

Figure 2:
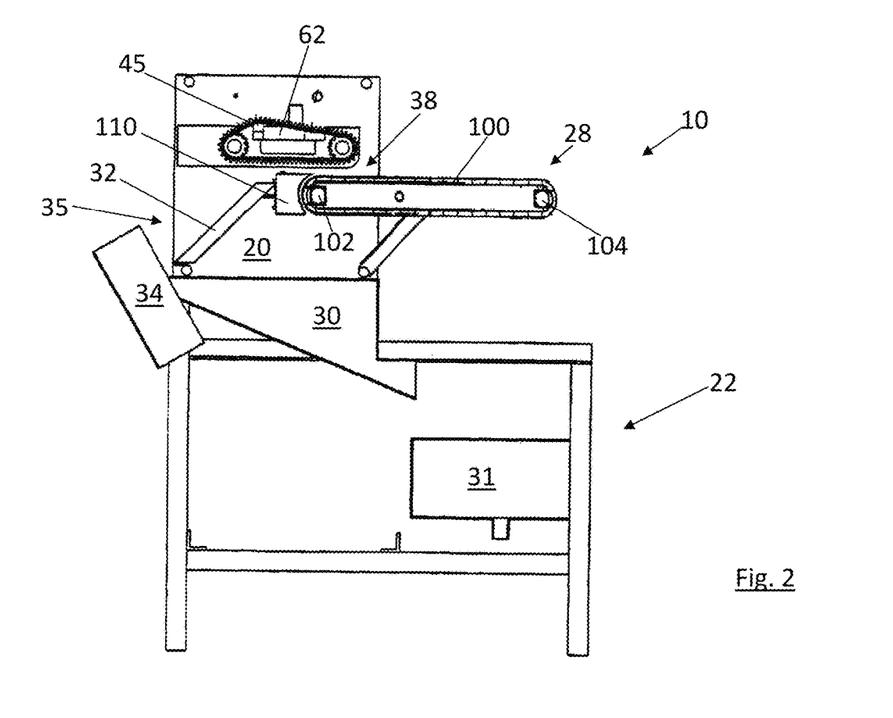
FIG. 2 is a side view illustrating an embodiment of the present invention.
Figure 3:
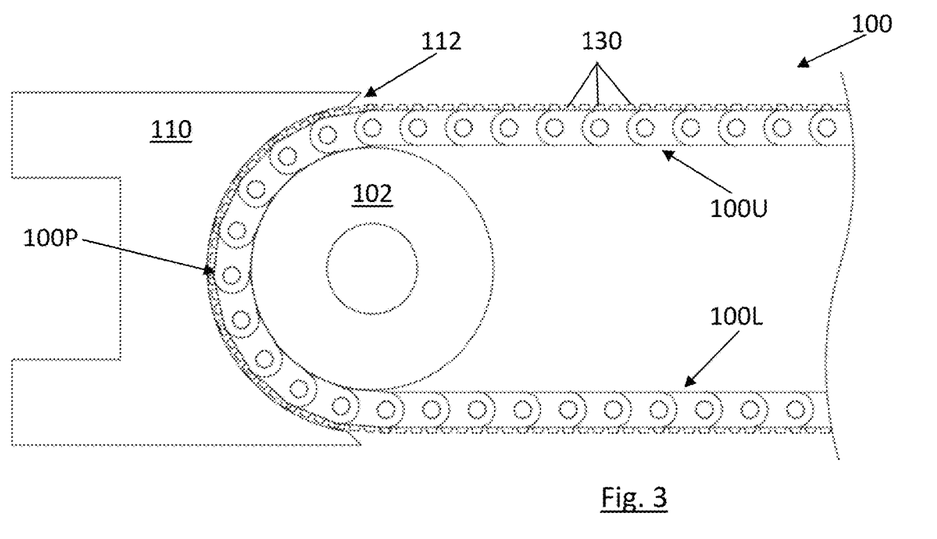
FIG. 3 is a side view illustrating an embodiment of the present invention.

With reference to FIGS. 2-3, an apparatus 10 constructed in accordance with the present invention for skinning pieces of poultry product is illustrated and includes a supporting frame, indicated generally at 20, which optionally can be mounted on a base or table, indicated generally at 22, for conveniently locating the apparatus 10 and any auxiliary product and skin collection means in the most practical arrangement for a given plant production layout.

The support frame 20 comprises sidewalls and, optionally, a top wall. The sidewalls may be mounted to the base 22 in any conventional manner well-known to those of ordinary skill in the art. The bottom of the frame 20 is open to communicate with a chute 30 for receiving the skin portions removed from the poultry product sections and directing them to a collection area, such as bin 31.

A rear discharge opening in frame 20 includes a ramp-like structure 32 which directs the skinned product to a separate collection area relative to the removed skin portions via a chute 34. The separate collection area for the skinned product may be a conventional bin or a conveyor, not shown, as dictated by the choice of the individual user of the apparatus and may be located in any designated area.

The frame 20 includes a frontal opening between the sidewalls and this opening forms a product feed inlet end 28. As seen in FIGS. 2-3, an endless belt conveyor 100 may be mounted to the frame 20 and employed to load product and carry it to the feed inlet 28 where it is delivered to a skinning station, indicated generally at 38. However, other forms of conveying the product to the feed inlet 28 may be employed to deliver the product to the skinning station 38 without departing from the present invention.

The skinning station 38 includes an endless chain belt 45 mounted on a chain support block 62 which in turn is mounted to one or both of the sidewalls in a vertically movable relationship. This allows the space defined between the lower run of the chain 45 and the upper surface of the conveyor belt 100 and pinch block 110 arrangement to automatically adjust to, and receive, a selected range of different sizes of poultry sections to be skinned. Furthermore, the arrangement maintains a substantially constant downward pressure or force on the poultry piece during the skin removal operation. The chain belt 45 functions to transport the piece of poultry product entering feed inlet 28 through the conveyor belt 100 and pinch block 110 arrangement.

The conveyor 100 is translatably mounted to the frame 20 and the wheel 102 or the wheel 104 is rotatably driven by a conventional motor in the counterclockwise direction so the upper span of the conveyor belt 100 is translated in the same downstream direction, at preferably the same speed, as the lower span of the chain 45. Thus, the conveyor 100 and the chain 45 cooperatively aid in moving the poultry product from the inlet end 28 toward the discharge end 35.

In the embodiment shown in FIG. 3, the endless loop conveyor belt 100 (only a portion of which is illustrated) may convey poultry pieces entirely to the pinch block 110. The conveyor belt 100 may extend from the product feed inlet end 28 of the apparatus to the pinch block 110, permitting a human operator of the apparatus or another conveyor to place poultry pieces thereupon so they are conveyed to the skinning station 38. There is no gap, as in the FIG. 1 prior art mechanism, between a conveyor and a paddle wheel (gripper member), because in the invention, there is no paddle wheel.

In the invention, the conveyor belt 100 extends around the wheel 102 adjacent the pinch block 110 to form a lower span 100L of the conveyor belt 100 and an upper span 100U, which are parallel and extend away from the pinch block 110. In the space between the wheel 102 and the pinch block 110, the radially outwardly-facing surface of a pinch block span 100P of the belt 100 extends in a close-clearance relationship with the arcuate pinch surface 112. Thus, there is a very small gap, such as 1.0 mm or less, between the distal tips of the protrusions 130 and the arcuate surface of the pinch block 110 that faces the protrusions 130. In places, there may be little to no gap.

Figure 4:
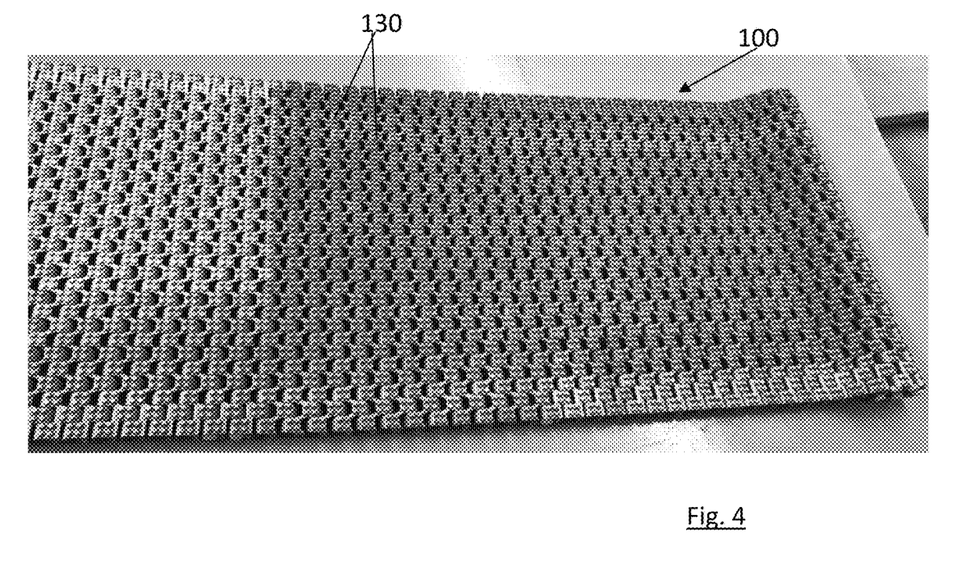
FIG. 4 is a view in perspective illustrating an embodiment of a belt used in the present invention.
Figure 5:
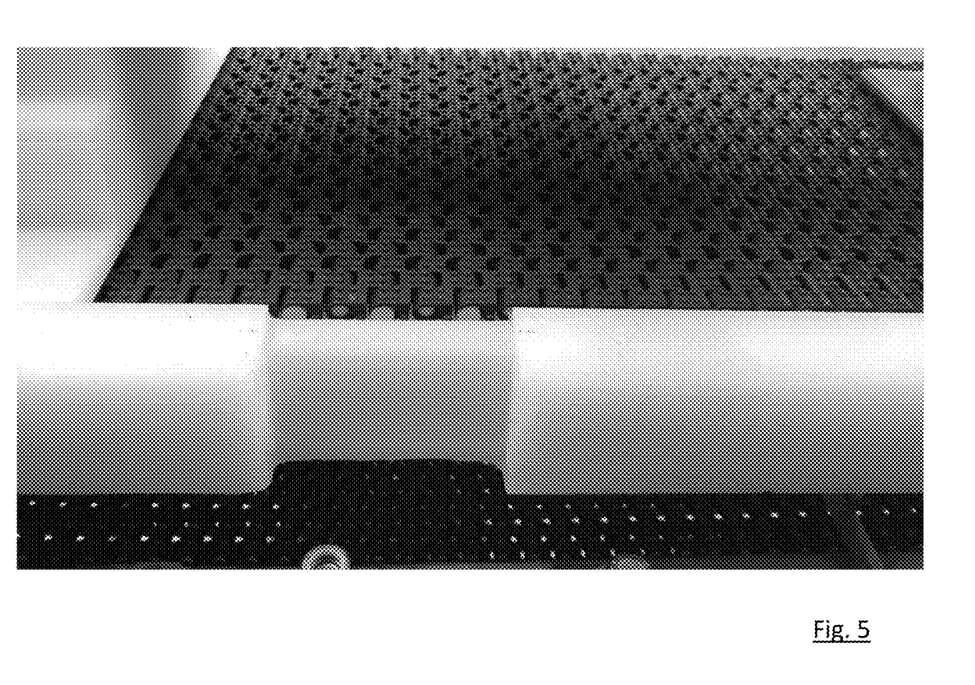
FIG. 5 is a view in perspective illustrating an embodiment of the invention using the belt illustrated in FIG. 3.

The endless loop conveyor belt 100 is preferably a flexible belt with protrusions 130 extending radially outwardly from the belt toward the pinch surface 112 where the belt extends around the wheel 102 adjacent the pinch surface 112. The protrusions 130 are shown in FIGS. 3 and 4 to be small, circularly-shaped nubs that have a width (laterally across the conveyor belt) similar to their length (along the length of the conveyor belt in the direction of movement of the belt). In some embodiments, the protrusions 130 may be circularly-shaped. In other embodiments, the protrusions may be rectangular, such as square. The protrusions 130 are shown in more detail in the examples shown in the illustrations. FIG. 4 shows the conveyor belt's upper surface with many round protruding nubs extending toward the viewer.

The conveyor belt 100 shown in FIGS. 2-6 is a modular belt made of numerous laterally-extending, longitudinally-aligned, sinusoidally-shaped modules that interlace with next adjacent modules. These relatively rigid modules are hingedly mounted to each next-adjacent module so that the modules form a combination that has the effective flexibility, due to the hinges, needed to extend around wheels, such as the wheels 102 and 104. Alternative conveyor belts may be made of a single, flexible material, such as polyurethane, rubber or any equivalent.

Figure 6:
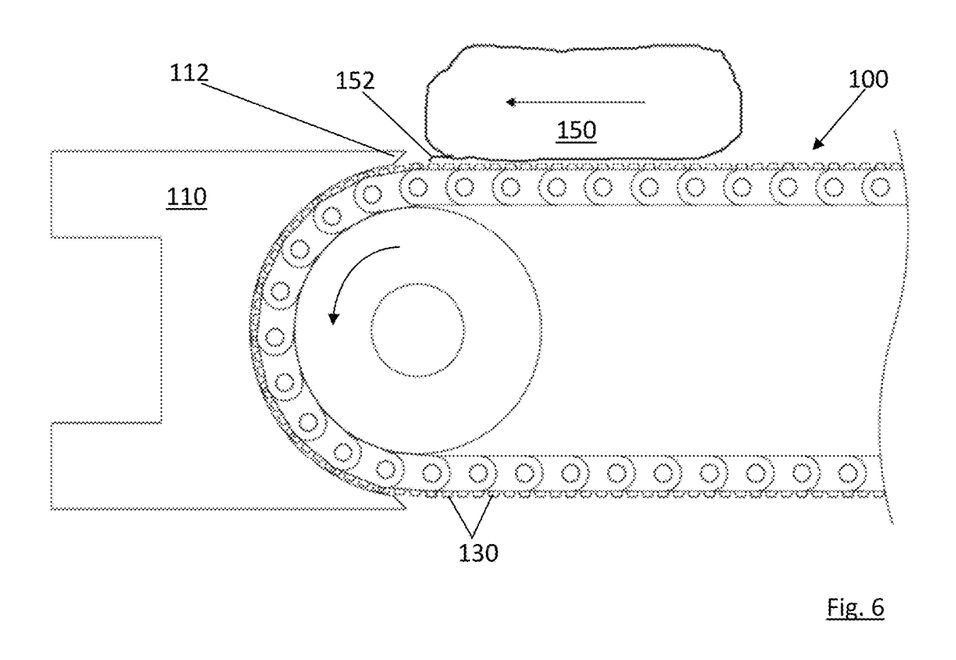
FIG. 6 is a side view illustrating the embodiment of FIG. 2 with a piece of poultry in an operable position.

As shown in FIG. 6, a poultry piece 150, which may be a breast, thigh, wing, or any other piece, may rest upon the conveyor belt 100 by being placed there by a person or a machine. When the poultry piece 150 is conveyed by the conveyor belt 100 to the pinch block 110 in the direction shown by the arrows in FIG. 6, the skin 152 may rest upon and/or sag between the protrusions, which are the nubs 130 in FIG. 6, and may be taken into the gap between the pinch surface 112 and the distal tips of the nubs 130. When the skin 152 is received in this small gap, it is trapped between the tips of the nubs and the pinch surface 112, which causes the skin to be gripped. And as the conveyor belt 100 continues translating the poultry piece 150 downstream, the skin is further stripped from the poultry piece 150 without tearing the muscle. This occurs by the portion of the skin that is gripped between the nubs 130 and the arcuate surface of the pinch block 110 further pulling more skin into the gap as the poultry piece 150 is moved downstream. Thus, once the leading edge of the skin is pulled into the gap and gripped, the movement of the entire poultry piece 150 downstream by the belt 100 facilitates further removal, at the same speed, of the skin 152 from the poultry piece 150.

Figure 7:
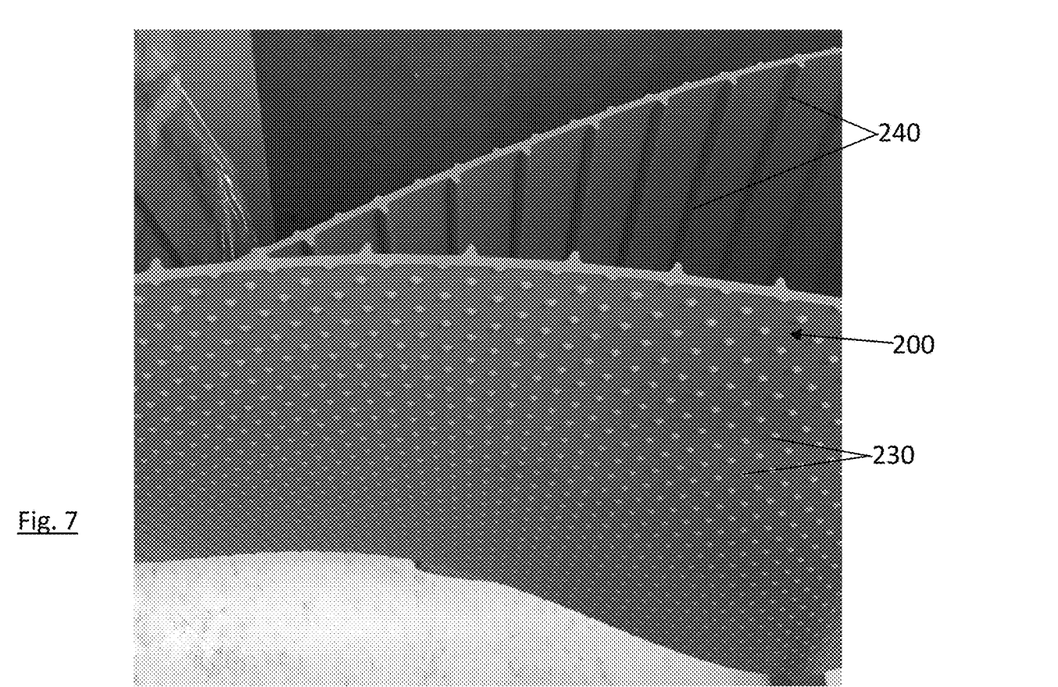
FIG. 7 is a view in perspective illustrating an embodiment of a belt used in the present invention.
Figure 8:
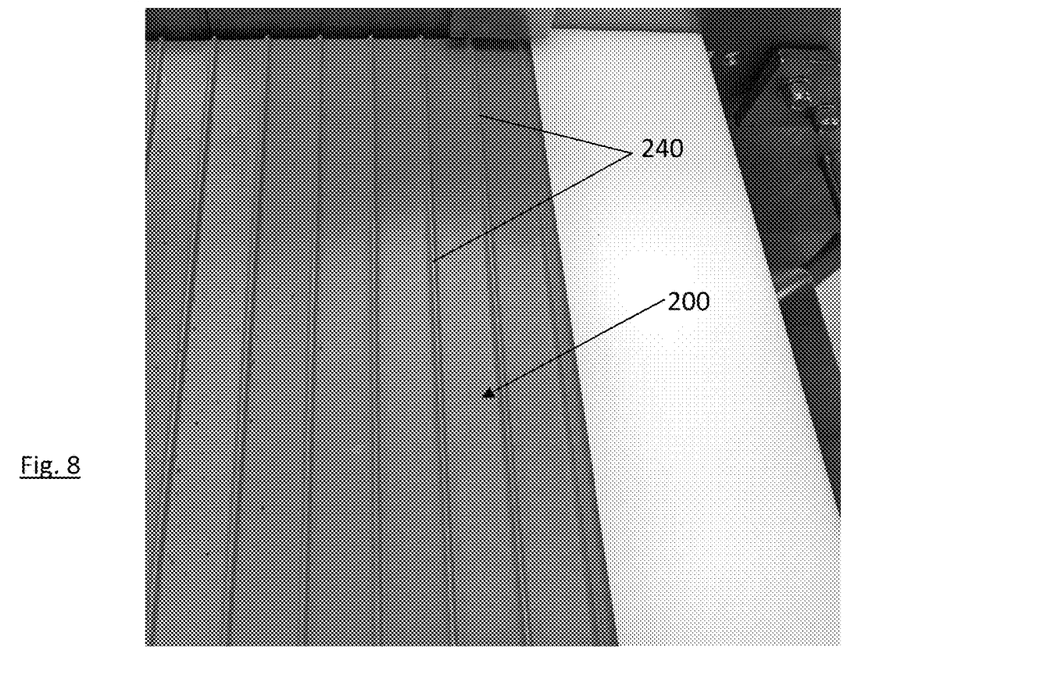
FIG. 8 is a view in perspective illustrating an embodiment of a belt used in the present invention.

In addition, or as alternatives, to the nubs 130, there are other protrusions contemplated for a conveyor belt. For example, in the image of FIG. 7, an endless belt 200 is made of a single flexible sheet, rather than a modular belt made of multiple connected components as with the belt 100. The belt 200 is shown having nubs 230 on one major surface and laterally-oriented and longitudinally-spaced ribs 240 on the opposite major surface. Both such structures protrude from the surface of the belt 200. It is contemplated that the nubs 230 face outwardly to contact the underside of poultry pieces during use, and the opposite side ribs 240 engage wheels or rollers (for example, in place of the wheels 102 and 104) that propel the belt 200. Alternatively, as shown in FIGS. 8 and 10, the belt 200 may be reversed so the nubs 230 face inwardly toward the wheels and the ribs 240 are shown facing outwardly to contact the underside of poultry pieces during use.

Figures 9, 10:
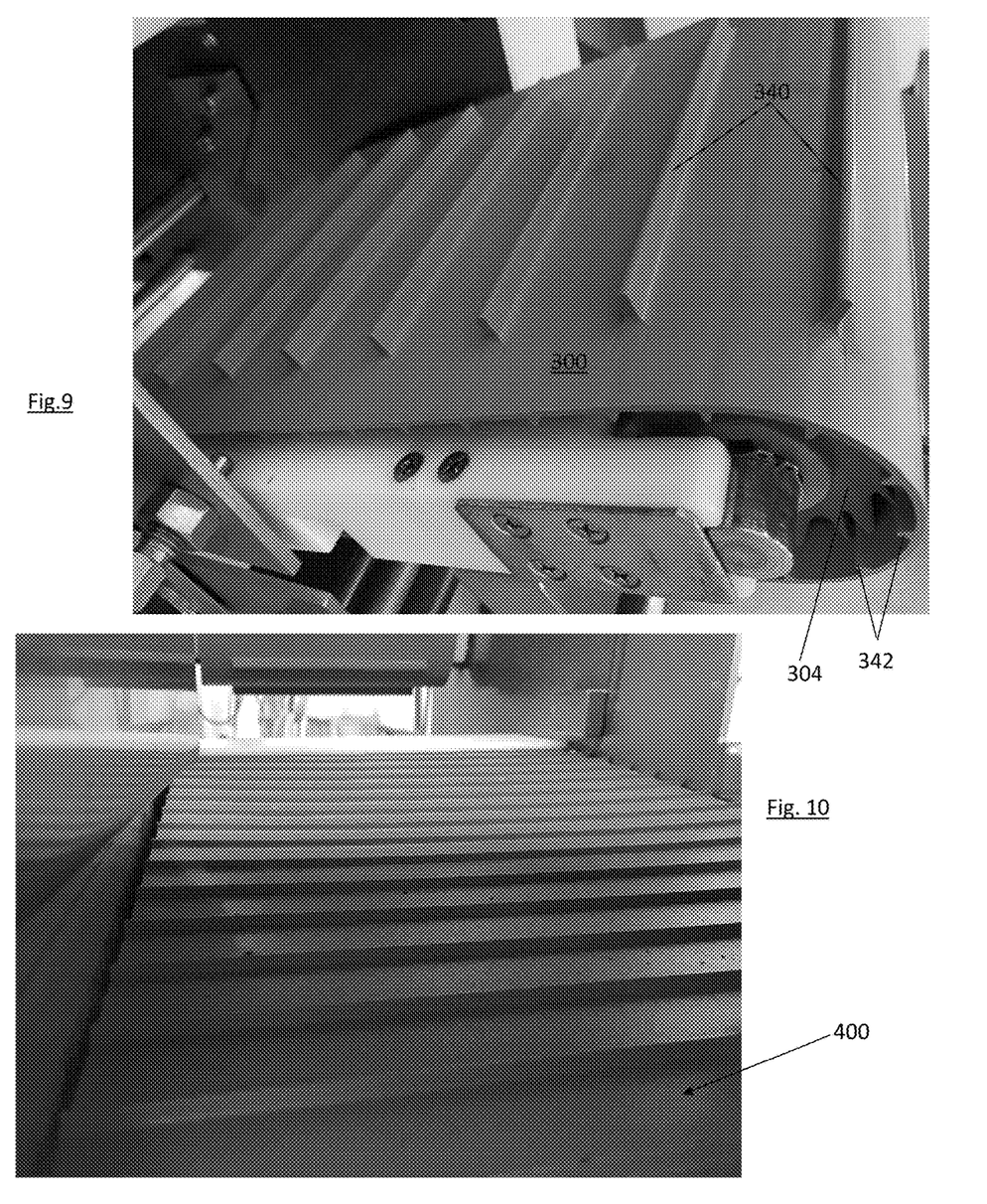
FIG. 9 is a view in perspective illustrating an embodiment of the invention.
FIG. 10 is a view in perspective illustrating an embodiment of the invention using the belt illustrated in FIG. 7.

In the embodiment shown in FIG. 9, the laterally-oriented ribs 340 on the belt 300 extend radially outwardly and are spaced about every 2-4 inches along the length of the belt. Radially-inwardly facing ribs 342 are used by the drive wheel 304 to propel the belt 300 along and reduce slipping between the wheel 304 and the belt 300. The belt 300 may be mounted in place of the belt 100 as shown above, and the distal tips of the ribs 340 may extend into contact with, or may be spaced a small distance from, the pinch surface 112 and the arcuate surface of the pinch block 110. Thus, as the belt 300 is conveyed along, the upper span of the belt 300 supports poultry pieces and conveys them downstream to the pinch block, while the lower span simply returns to the upstream end. At the pinch block 110, the skin on a poultry piece may sag between the ribs 340 and become gripped between the tips of the ribs 340 and the pinch surface 112 as the tips are conveyed adjacent the pinch surface 112. This grips and removes the skin as the poultry piece is conveyed over the pinch block and out through the discharge end of the machine.

The single piece conveyor belts 200 and 300 have no modules or other components that form gaps or openings where food particles and other debris can be trapped. Thus, the single piece conveyor belts 200 and 300 may be easier to thoroughly clean than the modular belt 100. Furthermore, the laterally-oriented ribs 240 and 340 produce different skinning effects than the smaller, more widely-distributed nubs 130 and 230. The belt 400 shown in FIG. 10 is also contemplated.

Figure 11:
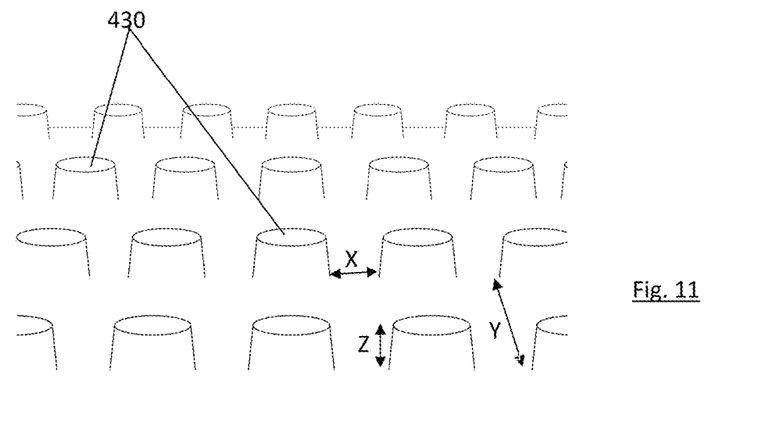
FIG. 11 is a schematic view in perspective illustrating exemplary protrusions.
Figure 12:
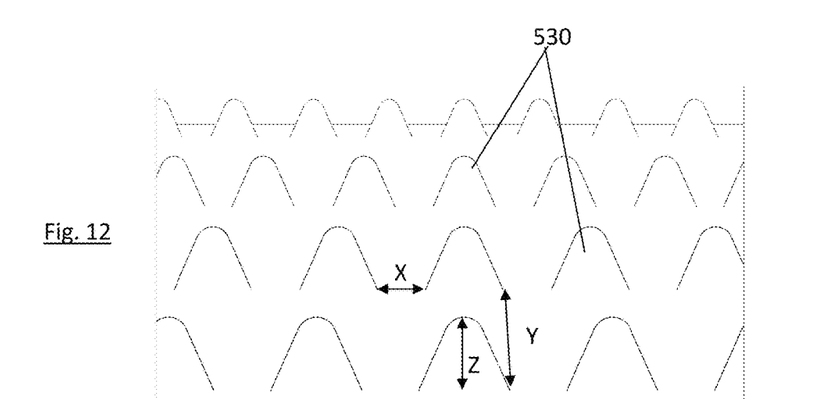
FIG. 12 is a schematic view in perspective illustrating exemplary protrusions.
Figure 13:
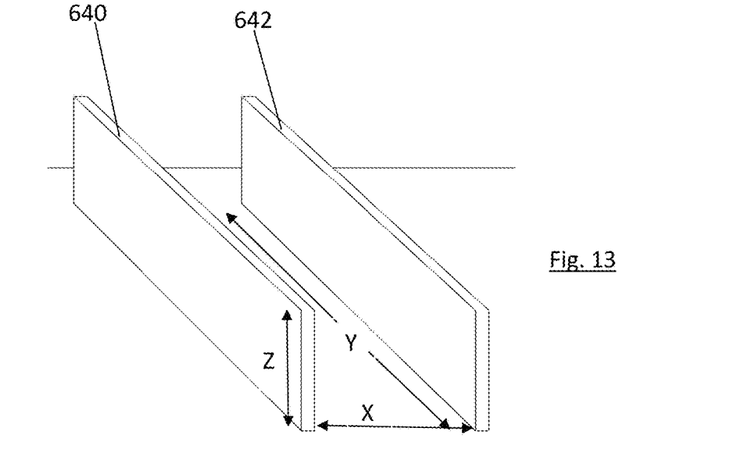
FIG. 13 is a schematic view in perspective illustrating exemplary protrusions.

The length and thickness of each rib, the spacing between ribs and nubs, their heights from the base of the belt, and other physical parameters have an effect on the skinning of different poultry products. As shown in FIG. 11, the protrusions, which may be the circular nubs 430, may be spaced in one direction by the distance, X, and may be spaced in another direction by the distance, Y. The height of the nubs 430, which is the distance from the base to the distal tip of each nub 430, may be the distance, Z. In one example, X is about 0.5 mm, Y is about 0.5 mm and Z is about 1.5 mm. These distances may vary.

When considering the ribs 240, 340, 640 and 642, the spacing may be in ranges. For example, the length of the ribs may be the distance, Y. The spacing between the ribs may be the distance, X. The height of the ribs may be the distance, Z. In one example, X may be about 3.0 inches, Y may be about 14 inches and Z may be 0.75 inches. In another example, X may be 2.0 inches, Y may be 24 inches and Z may be 0.5 inches.

Still further, the durometer and frictional resistance to sliding movement (against the pinch surface) of the polymer belt have an effect on the skinning, and these parameters may be modified to affect performance.

In one contemplated embodiment, the chain belt 45 is not included because the lower conveyor belt is sufficient to convey the poultry product to the pinch block. Once the skin is in the gap between the distal tips of the protrusions and the pinch block, the upper conveyor may not be necessary to continue to convey the poultry product downstream. Eliminating the chain belt 45 or any upper conveyor may reduce losses to the poultry product by such sticker chain mechanisms. This also simplifies the apparatus and reduces costs.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An automated poultry product skinning apparatus comprising, in combination:
   (a) a support frame provided with a product feed inlet and a product discharge outlet;
   (b) an upper conveyor mounted to the support frame and aligned to engage an upwardly-facing surface of a piece of poultry product delivered to the product feed inlet and direct the piece of poultry product in a path toward the product discharge outlet, the upper conveyor being mounted to the frame for selected vertical movement of at least an upstream end of the upper conveyor in response to the size of the piece of poultry product delivered to the product feed inlet;
   (c) an elongate lower conveyor mounted to the frame and having an endless conveyor belt comprising a plurality of protrusions projecting from the conveyor belt, the lower conveyor disposed in vertically spaced relationship below the upper conveyor for engaging a lower side of the piece of poultry product passing between the lower conveyor and the upper conveyor, the conveyor belt traveling along an arcuate path at the downstream end of the lower conveyor; and
   (d) a pinch block mounted on the frame and including an arcuate surface fixedly positioned in close clearance relationship to the arcuate path of the conveyor belt at the downstream end of the lower conveyor to define an opening configured to engage an outer skin attached to the piece of poultry product between the protrusions of the conveyor belt and the arcuate surface of the pinch block, wherein the close clearance relationship and the opening are configured to firmly entrap the attached outer skin between the protrusions of the conveyor belt and the arcuate surface of the pinch block to pull the outer skin from its attachment to the underlying muscle portions of the piece of poultry product without piercing or cutting of the outer skin upon continued translation of the conveyor belt and engagement of the piece of poultry product with the upper conveyor.

2. The automated poultry product skinning apparatus according to claim 1, wherein the protrusions are of a shape selected from circular, rectangular, and square.

3. The automated poultry product skinning apparatus according to claim 1, wherein the protrusions are tapered to define the distal tips of the protrusions.

4. The automated poultry product skinning apparatus according to claim 1, wherein the protrusions comprise ribs projecting from the conveyor belt and extending laterally across the conveyor belt.

5. An automated poultry product skinning apparatus comprising, in combination:
   (a) a support frame provided with a product feed inlet and a product discharge outlet;
   (b) an upper perimeter aligned to engage an upper surface of a piece of poultry product delivered to the product feed inlet and direct the piece of poultry product in a path toward the product discharge outlet;
   (c) an elongate lower conveyor movably mounted to the frame and having an endless conveyor belt comprising a plurality of protrusions projecting from the conveyor belt, the protrusions disposed in spaced relationship below the upper perimeter for engaging a lower surface of the piece of poultry product passing between the lower conveyor and the upper perimeter, the conveyor belt traveling along an arcuate path at the downstream end of the lower conveyor; and
   (d) a pinch block mounted on the frame and including an arcuate surface fixedly positioned in close clearance relationship to the arcuate path of the conveyor belt at the downstream end of the lower conveyor to define an opening between the endless conveyor belt and the arcuate surface of the pinch block, wherein the close clearance relationship and the opening are configured to firmly entrap the attached outer skin between the protrusions of the conveyor belt and the arcuate surface of the pinch block to pull the outer skin from its attachment to underlying muscle portions of the piece of poultry product without piercing or cutting the outer skin upon continued translation of the conveyor belt and engagement of the piece of poultry product.

6. The automated poultry product skinning apparatus according to claim 5, wherein the protrusions are of a shape selected from circular, rectangular, and square.

7. The automated poultry product skinning apparatus according to claim 5, wherein the protrusions are tapered to define the distal tips of the protrusions.

8. The automated poultry product skinning apparatus according to claim 5, wherein the protrusions comprise ribs projecting from the conveyor belt and extending laterally across the conveyor belt.

9. A method of removing the outer skin from a piece of poultry product, the method comprising:
   (a) introducing a piece of poultry product to a feed inlet defined between a moving upper conveyor spaced above an elongated lower conveyor comprising an endless conveyor belt provided with a plurality of protrusions projecting from the conveyor belt;
   (b) engaging an upper surface of the poultry product with the upper conveyor and a lower surface of the poultry product with the protrusions of the endless conveyor belt to propel the poultry product along a selected path of travel from the feed inlet toward a discharge outlet; and (c) gripping at least a portion of the outer skin attached to the poultry product between a fixed arcuate surface positioned in closely spaced mating relationship with a portion of the arcuate path of travel of the conveyor belt to cause the protrusions to firmly entrap and pull the attached outer skin of the piece poultry product away from its attachment to the underling meat portions without piercing or cutting the outer skin as the piece of poultry product moves along the selected path past the conveyor belt and toward the discharge outlet.

10. The method according to claim 9, wherein the protrusions are of a shape selected from circular, rectangular, and square.

11. The method according to claim 10, wherein the protrusions are tapered to define the distal tips of the protrusions.

12. The method according to claim 11, wherein the distal tip portions of the protrusions are truncated.

13. The method according to claim 12, wherein the protrusions comprise ribs projecting from the conveyor belt and extending laterally across the conveyor belt.

14. An automated poultry product skinning apparatus comprising, in combination:
   (a) a support frame provided with a product feed inlet and a product discharge outlet;
   (b) an elongated conveyor movably mounted to the frame and having a plurality of protrusions projecting from the conveyor for engaging a lower surface of a piece of poultry product delivered to the product feed inlet and direct the piece of poultry product in a path toward the product discharge outlet, the plurality of protrusions traveling along an arcuate path at the discharge end of the elongated conveyor; and
   (c) a pinch block mounted on the frame and including an arcuate surface closely corresponding to the arcuate path of the protrusions at the discharge end of the elongated conveyor and fixedly positioned in close clearance relationship to the arcuate path of the protrusions of the conveyor during a portion of their translation to define an opening between the discharge end of the conveyor and the arcuate surface of the pinch block, wherein the close clearance relationship and the opening are configured to firmly entrap the attached outer skin between the protrusions of the conveyor and the arcuate surface of the pinch block to pull the outer skin from its attachment to underlying muscle portions of the piece of poultry product without piercing or cutting the outer skin upon continued translation of the protrusions of the conveyor and engagement of the piece of poultry product with the conveyor.

15. The automated poultry product skinning apparatus according to claim 14,
   wherein the elongated conveyor comprising an endless belt traveling along an arcuate path at the downstream end of the conveyor to define an arcuate travel path of the belt in close clearance relationship with the arcuate surface of the pinch block; and
   wherein the protrusions project from the endless belt.

16. The automated poultry product skinning apparatus according to claim 14, wherein the protrusions are of a shape selected from circular, rectangular, and square.

17. The automated poultry product skinning apparatus according to claim 14, wherein the protrusions are tapered to define distal tips of the protrusions.

18. The automated poultry product skinning apparatus according to claim 17, wherein the distal tip portions of the protrusions are truncated.

19. The automated poultry product skinning apparatus according to claim 14, wherein the protrusions are spaced apart laterally with respect to the length of the conveyor at a first spacing and are spaced apart longitudinally with respect to the length of the elongated conveyor at a second spacing.

20. The automated poultry product skinning apparatus according to claim 14, wherein the protrusions comprise ribs projecting from the conveyor and extending laterally across the conveyor.

* * * * *